United States Patent
Silver

(12) 
(10) Patent No.: US 6,174,478 B1
(45) Date of Patent: Jan. 16, 2001

(54) METHOD AND APPARATUS FOR SIMULTANEOUS EXTRUSION OF TWO TRIPLE-WALL PIPES

(75) Inventor: Charles J. Silver, Asheville, NC (US)

(73) Assignee: Silver-Line Plastics Corporation, Asheville, NC (US)

(*) Notice: Under 35 U.S.C. 154(b), the term of this patent shall be extended for 0 days.

(21) Appl. No.: 09/160,423

(22) Filed: Sep. 25, 1998

(51) Int. Cl.⁷ .................................................. B29C 47/06
(52) U.S. Cl. ............................ 264/171.27; 264/173.12; 264/173.16; 425/133.1; 425/464
(58) Field of Search ........................... 425/131.1, 133.1, 425/464; 264/17.27, 173.12, 173.16

(56) References Cited

U.S. PATENT DOCUMENTS

| | | | |
|---|---|---|---|
| 3,963,403 | 6/1976 | Hughes et al. | 425/325 |
| 4,061,461 | 12/1977 | Hessenthaler | 425/462 |
| 4,076,477 | * 2/1978 | Hacke | 425/192 R |
| 4,100,064 | * 7/1978 | Gale | 210/23 H |
| 4,125,585 | 11/1978 | Rosenbaum | 264/173 |
| 4,182,601 | 1/1980 | Hill | 425/97 |
| 4,208,175 | 6/1980 | Rosenbaum | 425/134 |
| 4,364,882 | 12/1982 | Doucet | 264/45.9 |
| 4,465,449 | 8/1984 | Hornbeck | 425/131.1 |
| 4,469,819 | * 9/1984 | Lemoine et al. | 521/79 |
| 4,731,002 | 3/1988 | Spence et al. | 425/133.1 |
| 4,846,648 | * 7/1989 | Spence et al. | 425/133.1 |
| 4,885,196 | 12/1989 | Herrington | 428/36.5 |
| 5,062,782 | 11/1991 | Tompkins et al. | 425/113 |
| 5,102,922 | * 4/1992 | Kimura et al. | 521/145 |
| 5,542,834 | 8/1996 | Lupke | 425/133.1 |
| 5,580,405 | 12/1996 | Palmer | 156/73.1 |
| 5,616,350 | 4/1997 | Wissmann et al. | 425/133.1 |
| 5,620,714 | 4/1997 | Veen | 425/133.1 |

FOREIGN PATENT DOCUMENTS

| | | |
|---|---|---|
| 703 752 A | 3/1968 | (BE). |
| 0 595 198 | 4/1994 | (EP). |
| 0 885 712 | 12/1998 | (EP). |
| 2 089 719 | 6/1982 | (GB). |
| 60 000926 | 5/1985 | (JP). |
| 30 831 A | 3/1952 | (LU). |
| WO 96 29186 | * 9/1996 | (WO). |

OTHER PUBLICATIONS

International Search Report, mailed Jan. 26, 2000, for PCT/US 99/22136, which was filed Sep. 23, 1999.

* cited by examiner

*Primary Examiner*—Harold Pyon
*Assistant Examiner*—Joseph S. Del Sole
(74) *Attorney, Agent, or Firm*—Carter & Schnedler, P.A.

(57) ABSTRACT

There is provided a method and apparatus for simultaneously extruding two triple-wall pipes. A first extruder is connected to a first die in order to form the inner and outer wall of a first pipe and a second extruder is connected to a second die in order to form the inner and outer walls of a second pipe. A third extruder is connected to a Y-block which splits the output from a third extruder into two channels, one leading to the first die in order to form the foam core middle wall of the first pipe and the second leading to the second die in order to form the foam core middle wall of the second pipe.

9 Claims, 5 Drawing Sheets

METHOD AND APPARATUS FOR SIMULTANEOUS EXTRUSION OF TWO TRIPLE-WALL PIPES

BACKGROUND OF THE INVENTION

The present invention relates to triple-wall pipe extruders and particularly to a method and apparatus for simultaneously extruding two triple-wall pipes.

Single-wall plastic pipes made of solid PVC are in widespread use throughout the world. PVC pipe is lightweight, inexpensive and strong. PVC pipe has become a standard for many uses, such as, for example, for drains. In some cases, one single-wall pipe is extruded through a single die, while in other cases two single-wall pipes are simultaneously extruded by connecting a two channel Y-block between the extruder and a pair of dies.

For many applications, single-wall PVC pipe is somewhat over-designed, resulting in a waste of materials. In order to reduce waste, so-called triple-wall PVC pipes are used for many applications. A cross-sectional view of a typical triple-wall pipe 10 is shown in FIG. 4. Pipe 10 includes an inner wall 12 which is made of solid PVC plastic, a middle wall 14 which is made of PVC foam, and an outer wall 16 which is made of solid PVC plastic. Triple-wall PVC pipe is much lighter in weight than a single-wall pipe of the same thickness and, in addition, substantially less material is used. In some instances, a weight reduction as high as 29% has been achieved while still consistently passing the impact and strength requirements of ASTM-F-891.

The prior art includes many devices which are directed to extruding a triple-wall pipe, or more particularly, to dies which are designed to direct the output from a plurality of extruders into a format which will solidify into a triple-wall pipe. For example, U.S. Pat. No. 5,620,714 issued to Veen, discloses a distributor head for forming a tubular profile from one or more streams of extruded thermoplastic material. Veen discloses a die which includes one or more input channels for connection to one or more extruders and these channels divide one or more times before connecting to three concentric circular output channels at the opposite side of the die. Veen discloses use of three extruders, as shown in FIG. 1, including a first extruder 18 which provides thermoplastic material which forms the outer wall of a pipe, a second extruder 20 which provides thermoplastic material to form the middle or foam core wall of a pipe, and a third extruder 22 which provides thermoplastic material which forms the outer wall of a pipe. These extruders feed a die 24 which extrudes the thermoplastic material into concentric cylindrical walls which are then cooled within a cooling device 26 with the completed triple-wall pipe exiting the output opening 27 of cooling device 26.

A further prior art disclosure related to a die for shaping the output from a dual extruder system into a triple-walled pipe is shown in FIG. 2. This drawing is found in U.S. Pat. No. 4,846,648 issued to Spence et al., and entitled "Triple-wall Foam Co-Extrusion Apparatus." As shown in FIG. 2, Spence discloses a die apparatus 24 which includes a first extruder connection channel 28 and a second extruder connection channel 30. The first extruder connection channel 28 is designed for connection to a first extruder (not shown) in order to receive thermoplastic material, such as PVC, which is used to form the solid inner and solid outer wall of a triple-wall pipe, and the second extruder connection channel 30 is used to receive foam thermoplastic material from a second extruder (not shown) which is then fed through the die in order to form the middle wall or foam core of the triple-wall pipe.

In order to properly operate a single or a dual extruder system to form a triple-wall pipe it is desirable to create a die which does not constrict the flow of thermoplastic material, which delivers thermoplastic material at the proper rate to form an inner and outer wall and foam core of uniform thickness, and finally, a die which is well suited to the particular output capacity of the extruders to which it is connected. Experience has shown that extruders used to form the middle or foam core wall of a triple-wall pipe are typically not used to their full capacity due to the smaller amounts of thermoplastic material which is required to form the middle or foam core wall. This is particularly true with respect to the formation of smaller diameter pipes. Therefore it would be preferable to devise a method and apparatus for utilizing the full capacity of the extruders used to produce the foam thermoplastic material for the middle wall of a triple-wall pipe.

As previously discussed, the Spence die shown in FIG. 2 requires two extruders to produce one triple-wall pipe. Accordingly, four extruders are required to produce two triple-wall pipes at the same time. Providing a means to produce a greater amount of pipe in the same time frame with fewer extruders would increase the energy efficiency and lower the energy cost of the production line. The foam extruder would operate within a higher range of its capacity and there would be no heat loss from the additional tooling required for the four-extruder process. The invention would also save on floor space and require lower maintenance costs versus the four-extruder method.

OBJECTS OF THE INVENTION

It is therefore one object of the invention to provide an apparatus and method to more fully utilize the output of an extruder used to form the middle or foam core wall of a triple-wall pipe.

It is another object of the invention to provide an apparatus and method for increasing the output capacity and production efficiency of a three extruder system for producing triple-wall pipe.

It is yet another object of the invention to provide a method and apparatus for producing two triple-wall pipes with three extruders in the same amount of time that prior art systems produce two triple-wall pipes with at least four extruders.

SUMMARY OF THE INVENTION

In accordance with one form of the invention, there is provided an apparatus and method for producing simultaneous extrusions of two triple-wall pipes with three extruders. A first extruder is connected to a first die in order to form the inner and outer wall of a first pipe and a second extruder is connected to a second die in order to form the inner and outer walls of a second pipe. A connector is connected to a third extruder and to the first and second dies for providing material for the middle walls for both the first and second pipes. Preferably, the connector is a Y-block.

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENTS

Figure 3:
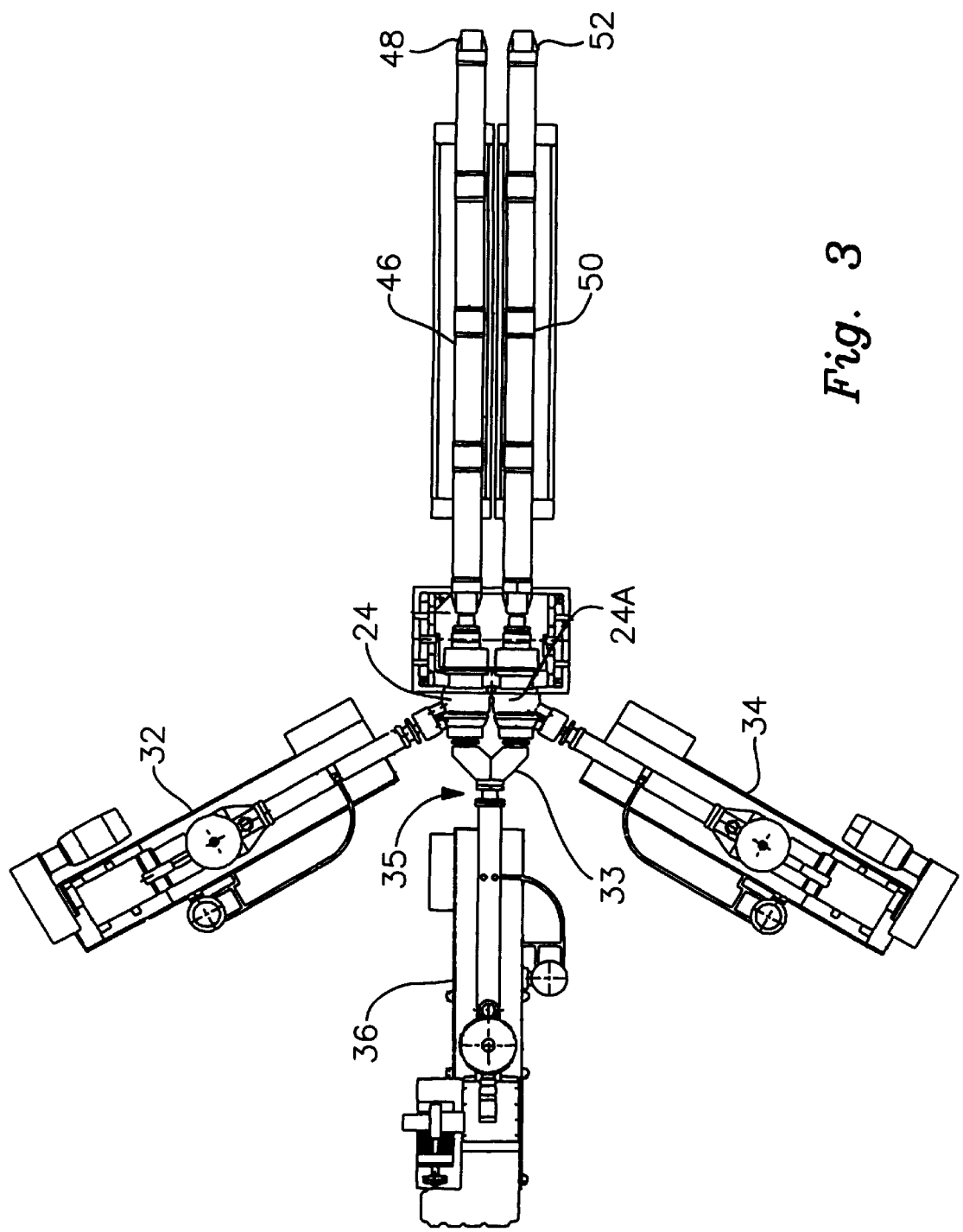
FIG. 3 is a plan view of the preferred embodiment of the present invention.
Figure 4:
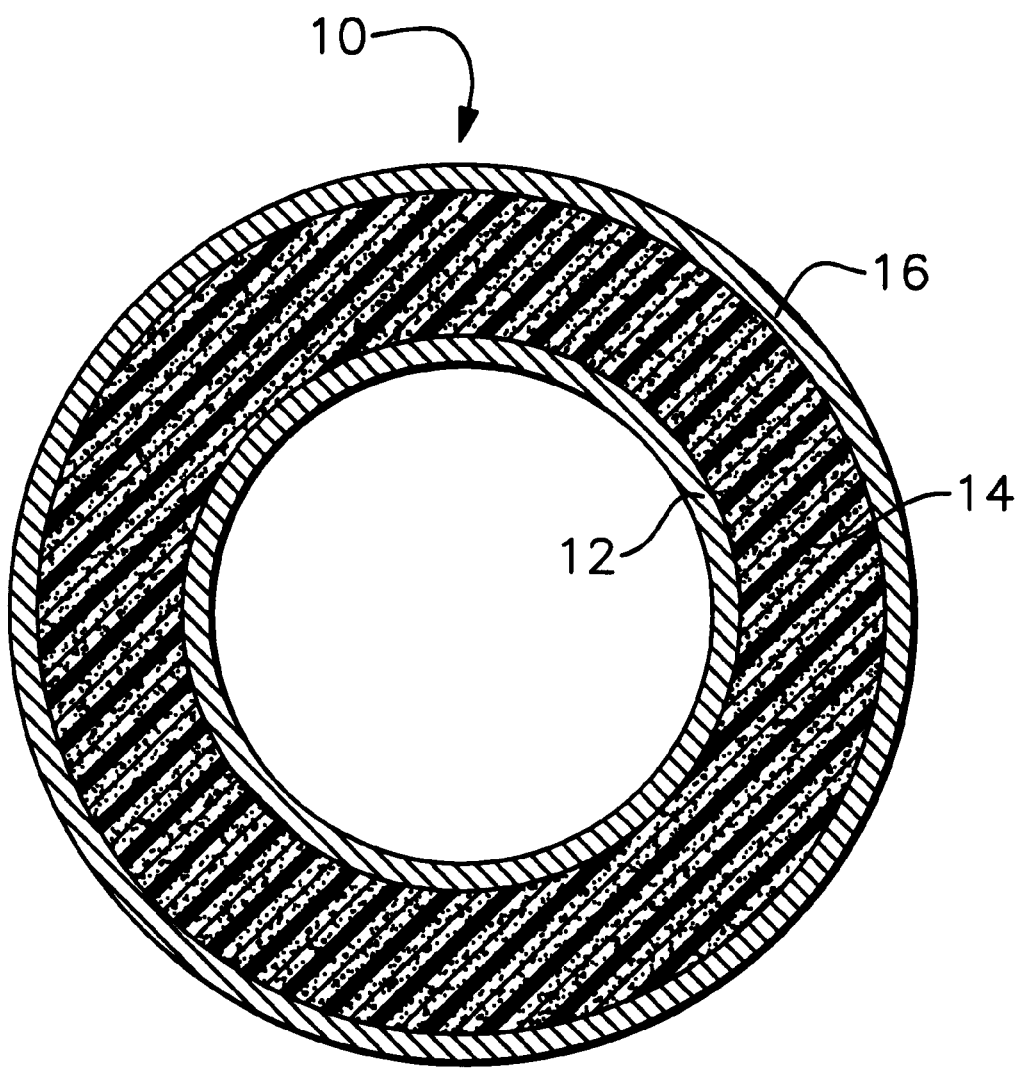
FIG. 4 is a cross-sectional view of a triple-walled pipe.

The preferred embodiment of the present invention is illustrated in FIG. 3 as including a first extruder 32 for extruding solid PVC for the inner and outer walls of a first pipe, a second extruder 34 for extruding solid PVC for the inner and outer walls of a second pipe, and a third extruder 36 for extruding the foam PVC middle wall or core for both the first and second pipes. Foam PVC may be formed by mixing a foaming agent, such as Azodicarbonamide, with PVC compound, and heating the mixture in the third extruder to a temperature of approximately 200° C. so that nitrogen bubbles form pockets in the melted PVC.

Figure 1:
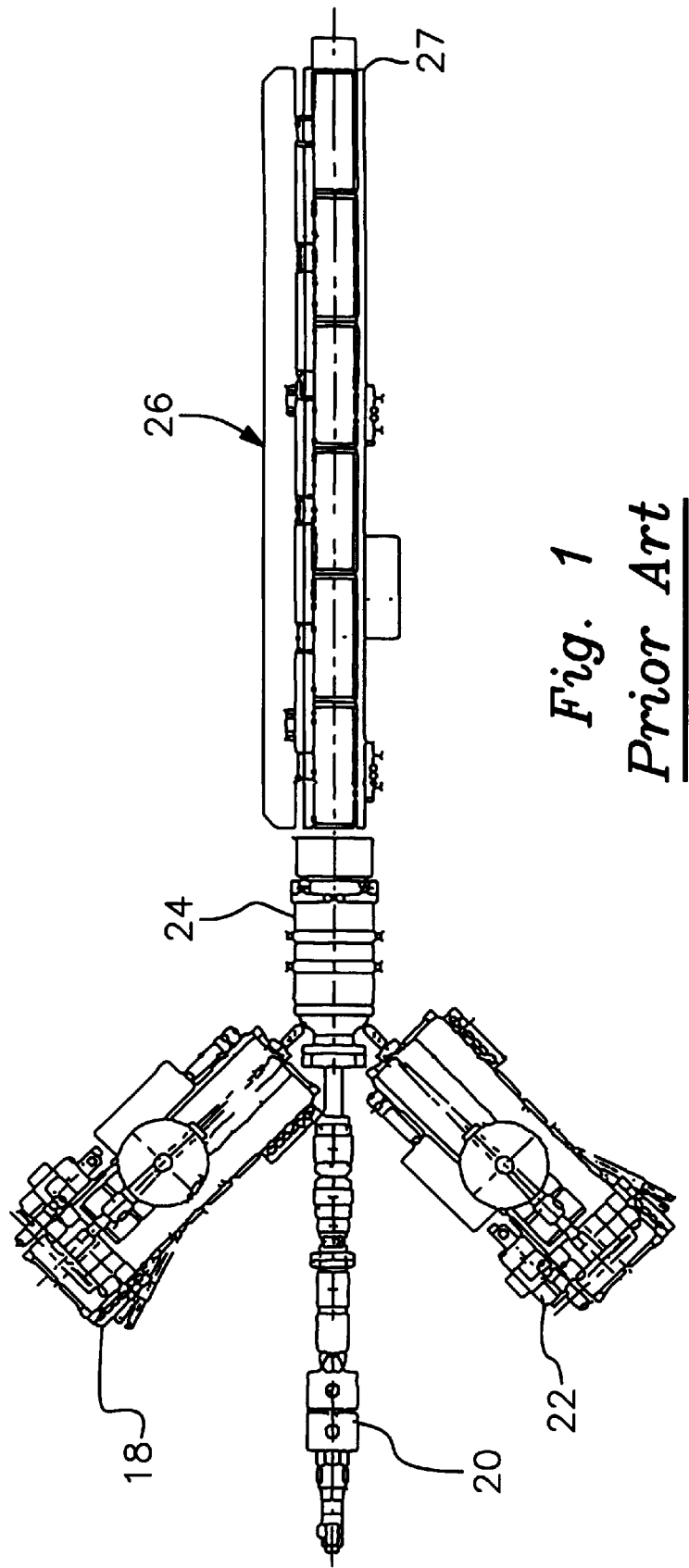
FIG. 1 is a plan view of a prior art device for producing triple-walled pipe with three extruders.
Figure 2:
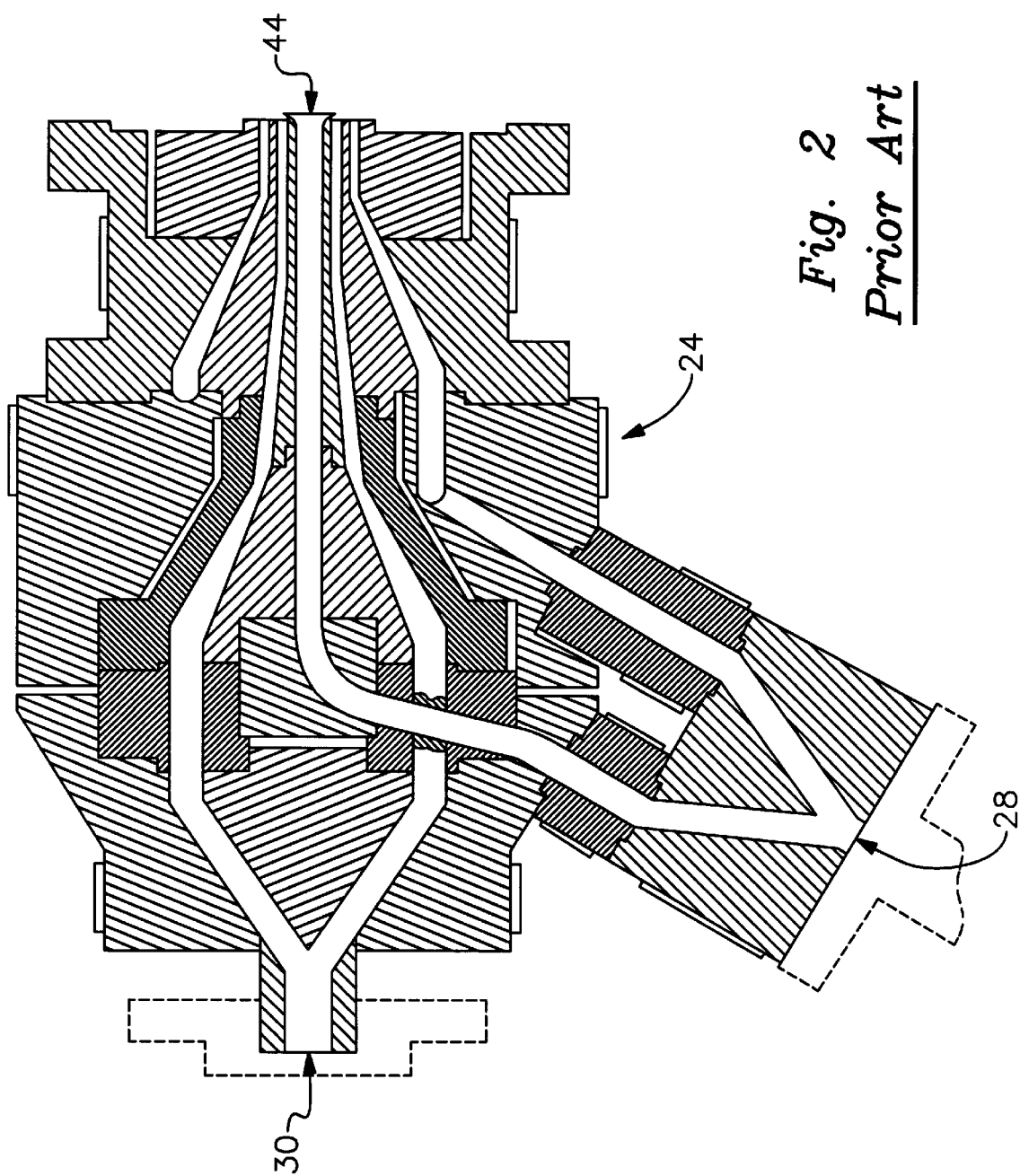
FIG. 2 is a cross-sectional view of a prior art die used with two extruders to produce triple-walled pipe.

As shown in FIG. 3, the first extruder 32 and third extruder 36 in this embodiment are connected to die 24, and the second extruder 34 and the third extruder 36 are connected to die 24A. Each die, 24 and 24A, are preferably identical to the prior art co-extrusion die of FIG. 2. Extruder connection channel 30, shown in FIG. 2, for each die 24 and 24A receives foam PVC output indirectly from third extruder 36, as will be explained below. Extruder connection channel 28 receives solid PVC output from the first extruder 32 or the second extruder 34, as the case may be, which is fed into the dies 24 and 24A in order to produce both the inner and outer solid walls of the two triple-wall pipes. The construction and operation of dies 24 and 24A are more fully described in U.S. Pat. No. 4,846,648, which is hereby incorporated herein by reference.

Figure 5:
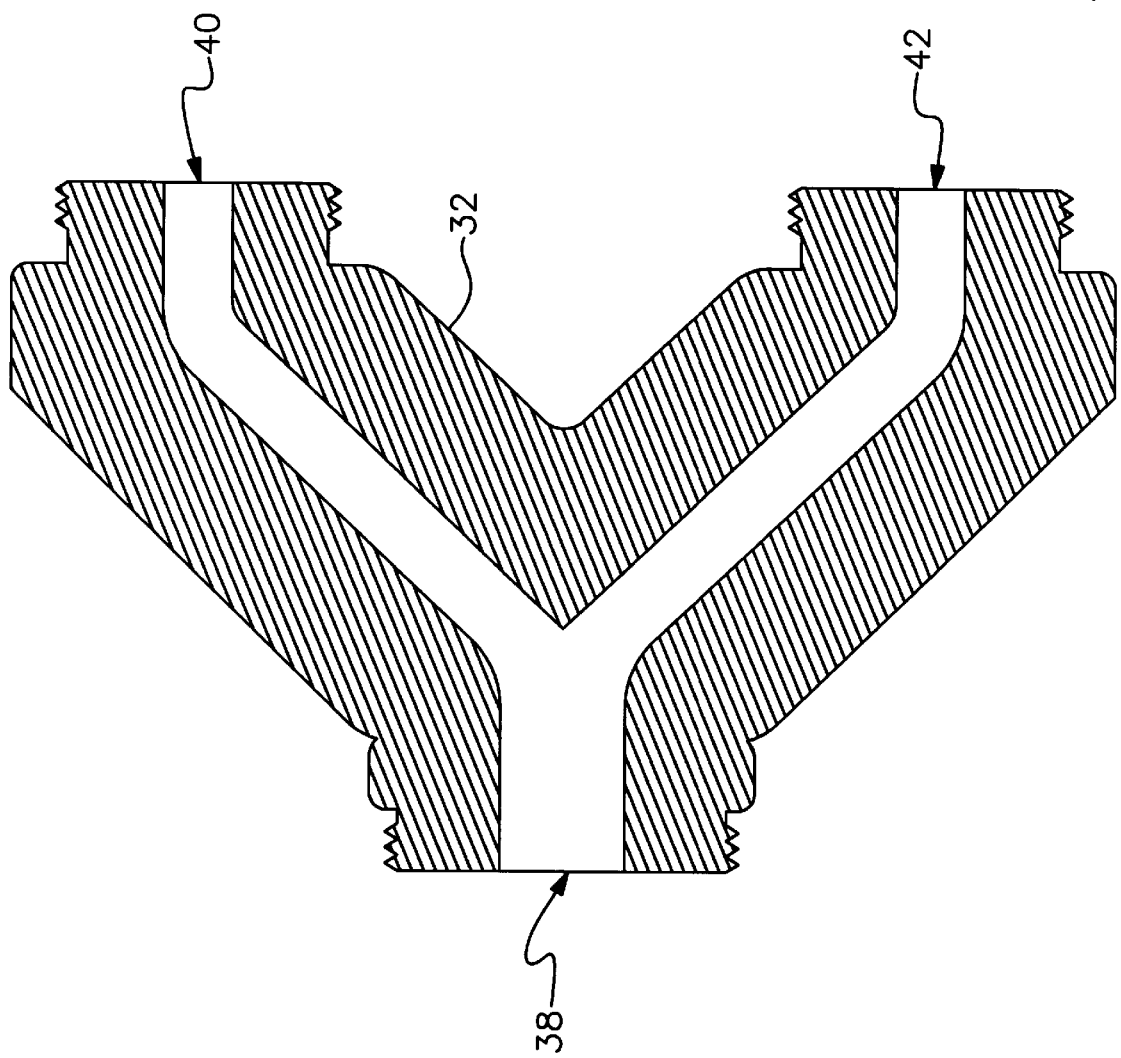
FIG. 5 is a cross-sectional view of the Y-block connector used with the present invention.

As shown in FIG. 3, the preferred embodiment invention is realized by addition of the connector 33, which is preferably a Y-block, which is positioned between the foam core extruder 36 and the two dies 24 and 24A. This Y-block connector 33 functions to split the output from the foam core or third extruder 36 into two output channels which are connected to the respective input channels 30 of dies 24 and 24A. As shown in FIG. 5, the Y-block connector 33 includes an input channel 38, which is connected to a first output channel 40 and to a second output channel 42. The Y-block connector input channel 38 is connected to the output 35 of third extruder 36 for receiving foam PVC therefrom, and output channels 40 and 42 of Y-block connector 33 are respectively connected to the input channels 30 of each die 24 and 24A.

The output channel 44 of die 24 is connected to cooling device 46. The first completed triple-wall pipe exits the output 48 of cooling device 46. The output channel 44 of die 24A is connected to cooling device 50. The second completed triple-wall pipe exits the output 52 of cooling device 50.

By using the method and apparatus described above, two triple-wall foam core pipes may be simultaneously extruded using the full capacity of all three extruders in the same time it would take to extrude the same amount of pipe using four extruders using a prior art design.

From the foregoing description of the preferred embodiment of the invention, it will be apparent that many modifications may be made therein. It will be understood, however, that this embodiment of the invention in an exemplification of the invention only and that the invention is not limited thereto. It is to be understood therefore that it is intended in the appended claims to cover all modifications as fall within the true spirit and scope of the invention.

What is claimed is:

1. A method for simultaneously extruding two triple-wall pipes, comprising the steps of:

injecting material from a first extruder into a first die;

injecting material from a second extruder into the second die;

injecting foam material from a third extruder into a connector which is also connected to the first die and to the second die;

splitting the foam material in the connector into two streams;

injecting the foam material into the first die and the second die;

forming the inner and outer walls of the first pipe using the material from the first extruder;

forming the inner and outer walls of the second pipe using the material from the second extruder;

forming the middle walls of the first and second pipes using the foam material from the third extruder.

2. A method as set forth in claim 1, wherein said connector is a Y-block.

3. A method as set forth in claim 1, wherein said material is PVC.

4. Apparatus for simultaneously extruding two triple-wall pipes, comprising:

a first co-extrusion die;

a first extruder connected to said first die for providing material for forming the solid inner and outer walls of a first pipe;

a second co-extrusion die;

a second extruder connected to said second die for providing material for forming the solid inner and outer walls of a second pipe;

a connector connected to said first die and to said second die;

a third extruder connected to said connector for providing foam material for forming the foamed middle walls for both the first and second pipes.

5. Apparatus as set forth in claim 1, wherein said connector is a Y-block.

6. Apparatus as set forth in claim 1, wherein said material is PVC.

7. Apparatus as set forth in claim 4, wherein said first die includes first and second input openings, and said second die includes first and second input openings; said first extruder connected to said first input opening of said first die, and said second extruder connected to said first input opening of said second die; said third extruder is connected to said second input opening of said first and second dies through said connector.

8. Apparatus as set forth in claim 5, wherein said Y-block includes an input channel and first and second output channels; said third extruder connected to said input channel of said Y-block; said first die connected to said first output channel of said Y-block; said second die connected to said second output channel of said Y-block.

9. Apparatus for use in combination with first, second and third extruders and two co-extrusion dies for the simultaneous extrusion of two triple-wall pipes, wherein said first and second extruders provide material for the solid inner and outer walls of the pipes and the third extruder provides foam material for the foamed middle wall of the pipes, comprising:

a Y-block connector attached to said third extruder and to said two dies for splitting the output from said third extruder into two streams which are fed into said two dies.

* * * * *